United States Patent
Martino et al.

(10) Patent No.: US 6,486,898 B1
(45) Date of Patent: Nov. 26, 2002

(54) DEVICE AND METHOD FOR A LATTICE DISPLAY

(75) Inventors: Jacquelyn Martino, Cold Spring, NY (US); Nevenka Dimitrova, Yorktown Heights, NY (US); Kaushal Kurapati, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/282,321

(22) Filed: Mar. 31, 1999

(51) Int. Cl.$^7$ ............................................. G09G 5/00
(52) U.S. Cl. ..................... 345/853; 345/855; 345/440; 345/835
(58) Field of Search ............................. 345/356, 968, 345/853, 855, 440, 835, 788, 792; 704/257; 707/3, 4, 104.1, 6

(56) References Cited

U.S. PATENT DOCUMENTS

| | | | |
|---|---|---|---|
| 5,341,466 A | 8/1994 | Perlin et al. ............... | 395/139 |
| 5,561,757 A | 10/1996 | Southgate ................... | 395/157 |
| 5,689,287 A | 11/1997 | MacKinlay et al. .......... | 345/4 |
| 6,154,213 A | * 11/2000 | Rennison et al. ........... | 345/356 |
| 6,169,972 B1 | * 1/2001 | Kono et al. ................. | 704/257 |
| 6,188,405 B1 | * 2/2001 | Czerwinski et al. ........ | 345/339 |

FOREIGN PATENT DOCUMENTS

| | | | |
|---|---|---|---|
| EP | 0348884 A2 | 1/1990 | ......... G06F/15/401 |
| WO | WO9815890 | 4/1998 | ........... G06F/3/033 |

OTHER PUBLICATIONS

R. Fowler et al.; "Integrating Query, Thesaurus, and Documents through a Common Visual Representation" Proceedings of the Annual International ACM/SIGIR Conference on Research and Development in Information Retrieval, New York, IEEE, vol. Conf. 14, pp. 142–151, Oct. 1991.

J. Lamping et al.; "A Focus+Context Technique Based on Hyperbolic Geometry for Visualizing Large Hierarchies" Conference on Human Factors in Computing Systems, New York, ACM, pp. 401–408, May 1995.

* cited by examiner

Primary Examiner—Kristine Kincaid
Assistant Examiner—Mylinh Tran

(57) ABSTRACT

Information nodes are dynamically organized and information related to each node is displayed in dependence upon a user's indicated reference node. The information related to the reference node is displayed prominently, and information items related to the other nodes are displayed with a prominence that reflects each node's degree of separation from the user selected reference node. Both size and position are used to indicate prominence. To present a consistent interface regardless of the user's point of reference, recursive techniques, such as fractal based algorithms, are used in a preferred embodiment.

19 Claims, 8 Drawing Sheets

DEVICE AND METHOD FOR A LATTICE DISPLAY

BACKGROUND OF THE INVENTION

1. Field of the Invention

This invention relates to the field of computers, and in particular to the field of display devices.

2. Description of Related Art

Conventional presentation and display techniques are becoming increasingly less effective and efficient as the quantity of available information continues to increase. Hypertext and hyperlinks provide a dramatic increase in the ease of locating and viewing related information items compared to pre-hypertext methods, but are limited by their singularity. While reading a document that contains multiple hypertext items, the reader may access each item directly, but is not provided a view of how these individual items relate to each other, or whether there are other items more closely related to the document being read that also relate to these same hypertext items.

Methods for identifying relations among information items are becoming increasingly common. Entire libraries of books can be categorized and cross referenced. The laws and court cases and opinions of an entire country have been categorized and cross referenced. Starting at virtually any point in each system, a user can navigate within the system along a particular path of inquiry using identified relations between information items. For example, a person may be viewing a book on astronomy, which contains a reference to Copernicus. Following a link to a text on Copernicus, the person may find a link to Galileo, then to Newton, or Michelangelo, and so on. Although these links are well defined, and within the reference system form a web-like or lattice interconnection network, the user's navigation abilities through this complex network are limited to single step links, with do map to provide an overall picture of where in the general scheme of things each single step may lead, where alternative steps may be taken, or what interesting steps may be missed.

Tools such as tables of content and indexes are employed for locating related items in a text, and attempts have been made to apply these tools to larger search tasks. Items are classified by categories within a hierarchical structure, and the user is provided a means for locating items based on the hierarchy, much like the organization of a book by chapters, sections, sub-sections, etc. The above library example references to Copernicus and Galileo would likely be categorized at the same level in a hierarchy of "physical science: astronomy: early history". Other astronomers prominent in the early history of astronomy would also be located at this level in the hierarchy. Conventional information indexes present the hierarchical information as a tree structure, from which the user can determine what information is available and how the individual items are related. Such a hierarchical organization structure is also common for organizing files in a computer system. Related items are placed in a folder, related folders are placed in a higher level folder, groups of related higher level folders are placed on a node in a network, and so on. Tools are provided for traversing the hierarchy by opening each subsequent node to reveal subsequent lower level nodes. Provided that sufficient display space is available, the user can display the contents of each of the opened nodes to place the current node "in context" with the overall structure.

Hierarchical display techniques, however, are limited to the display of information arranged in a hierarchical fashion, and limited to the topic used to form the hierarchy. In the library example, Newton may be related to other information items that have no bearing on the early history of astronomy, and these other items would not be included in the above example "physical science: astronomy" hierarchy. In like manner, Michelangelo's contribution to astronomy might not warrant his inclusion in the "physical science: astronomy" hierarchy, although a relationship to Galileo and Newton may exist, for example when viewed from a church history viewpoint. Typically, a hierarchical display technique relies on the use of hypertext and hyperlinks to provide such secondary links to other items, outside the task of displaying the hierarchy.

Rarely, if ever, are information items related solely by a hierarchical relationship. Most information items are related to each other in a variety of ways, at various degrees of separation. A graphic representation of the various relationships typically forms a web-like or lattice structure. The conventional display of items that are related in a lattice structure is typically effected by presenting the items in a two dimensional form, with arrows indicating each link, as illustrated in FIG. 1.

FIG. 1 illustrates ten information items, or nodes, I0–I9, interconnected by seventeen different links, identified by Lmn, where m and n are the numerical references (0–9) to the interconnected nodes I0–I9. The links Lmn are illustrated as bidirectional links, although unidirectional relationships and links may exist in some applications of a lattice structure. By following the links, a user can determine relationships between these information items, and navigate via the links or directly to a node of interest.

The illustration of FIG. 1 has a number of limitations. The representation of ten nodes and their seventeen relationships forms a fairly complex image; the representation of hundreds of nodes and thousands of relationships in this manner would be virtually unusable as a navigation aide beyond, perhaps, a single link traversal. The representation of FIG. 1 would not be feasible for potentially thousands of nodes and millions of relationships, or more. The other limitation to the conventional lattice display of FIG. 1 is its uniformity. As compared to a hierarchical presentation, wherein the location of a node indicates its relevance within the general scheme of things, it is difficult to associate an implied significance to a node based on its appearance in the conventional lattice display. In general, this may not present a problem, because the significance of each node in a lattice structure is usually indeterminable, without an assumed context. That is, for example, the nodes corresponding to Galileo, Newton, Copernicus, and Michelangelo in the above library example are of equal significance from the context-free viewpoint of the library. Another limitation of the conventional lattice display is that the organization of the display does not convey an immediate impression of the relationships among the items. For example, it is not immediately apparent that node I6 is closely related to nodes I5 and I2, but only distantly related to node I9, except by tracing each of the arrows from the node I6, and then from each of the immediately connected nodes to subsequent nodes. Some conventional lattice displays attempt to overcome this limitation by highlighting all the nodes that are connected to a selected node, but this solution is again limited to single link relationships and a single step navigation approach.

BRIEF SUMMARY OF THE INVENTION

It is an object of this invention to provide a method and device for presenting related information items in a manner that facilitates a recognition of the relationship among the information items. It is a further object of this invention to provide a method and device for presenting related information items that facilitates a recognition of relationships based upon a context. It is a further object of this invention to provide a method and device for presenting information based on the degree of separation between and among related items. It is a further object of this invention to provide a method and device for presenting information that is suitable for the display of a large number of related items.

These objects and others are achieved by dynamically organizing and displaying related information items in dependence upon a user's indicated point of reference. The user's point of reference is displayed prominently, and information items that are related to the point of reference are displayed with a prominence that reflects each item's degree of separation from the user's point of reference. Both size and position are used to indicate prominence. To present a consistent interface regardless of the user's point of reference, recursive techniques, such as fractal based algorithms, are used in a preferred embodiment.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
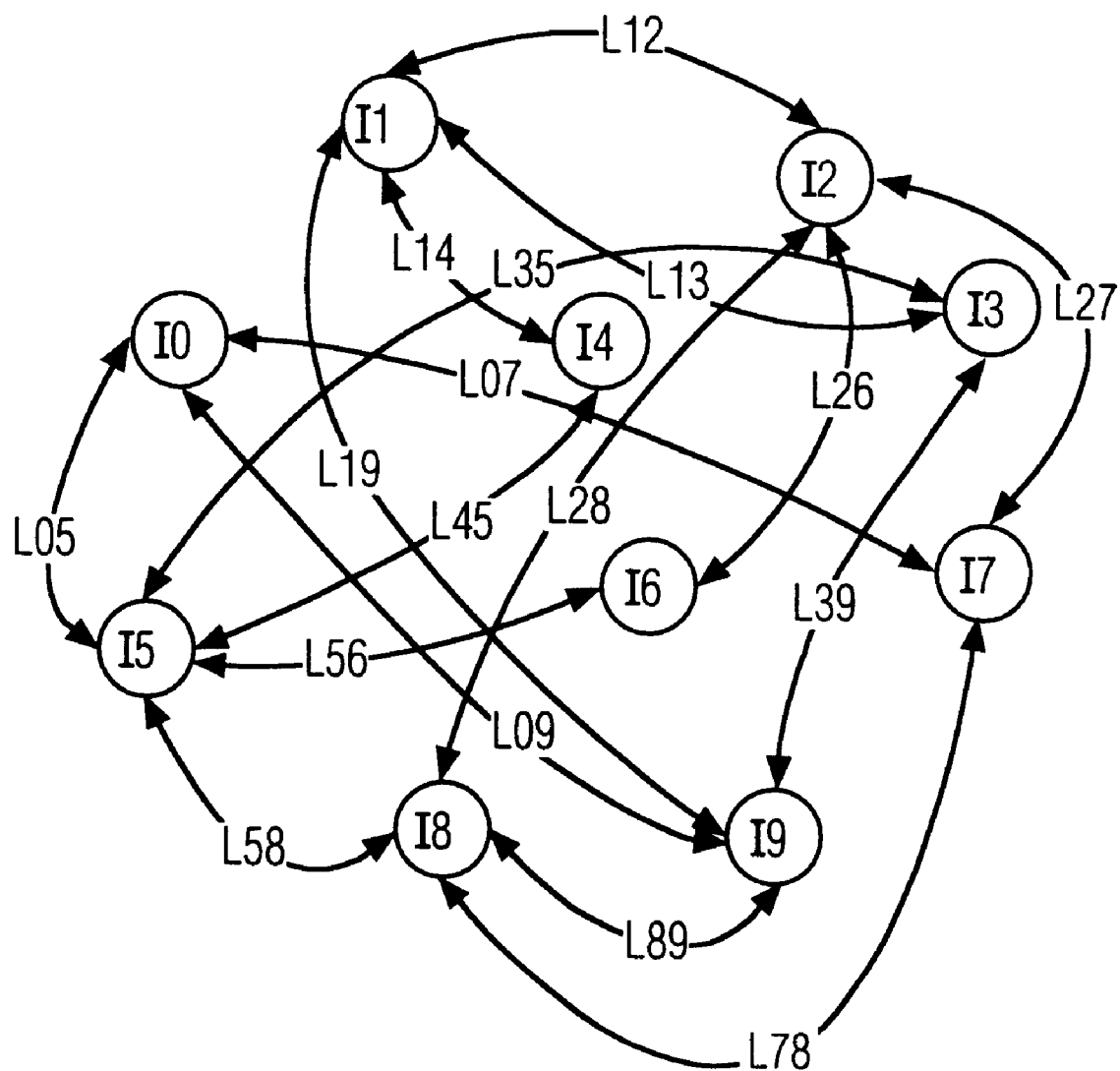
FIG. 1 illustrates an example conventional lattice of information items.
Figure 2:
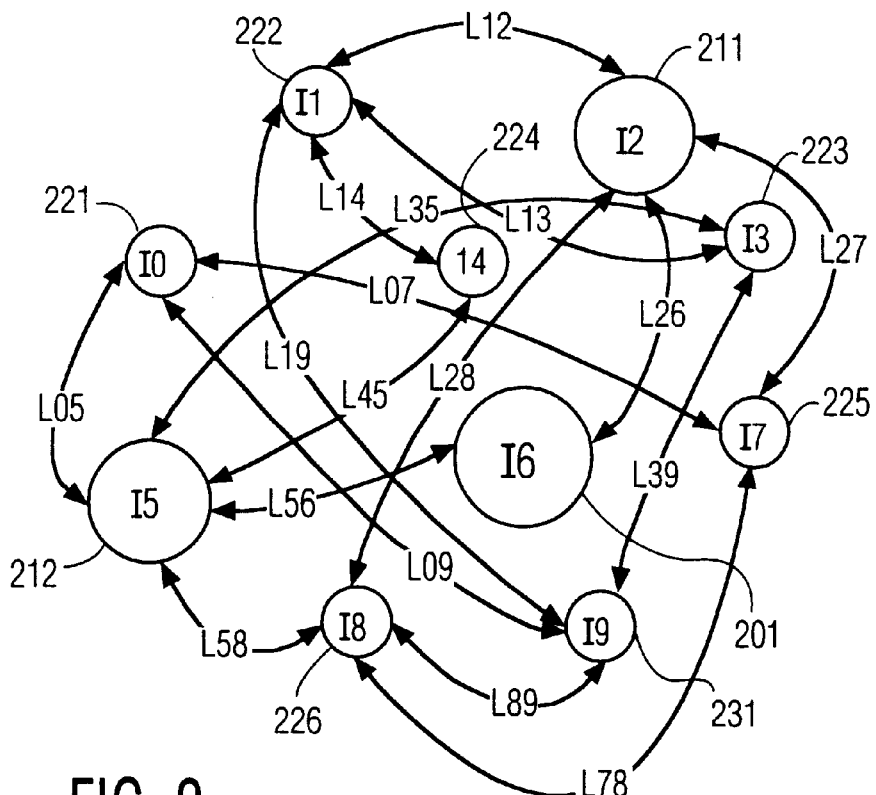
FIGS. 2–7 illustrate example lattice displays in accordance with this invention.

FIG. 2 illustrates an example display of the lattice structure of FIG. 1 in accordance with this invention. In this example, a user (not shown) has selected node I6 201 as the user's current point of reference. In accordance with one aspect of this invention, the current point of reference 201 is displayed prominently, in this example by an enlarged size compared to the other nodes in the lattice structure. Items that are closely related to the point of reference, that is, items I2 211 and I5 212 that are within one link of the point of reference I6 201 are displayed more prominently than the items I0 221, I1 222, I3 223, I4 224, I7 225, I8 226, and I9 231 that are less closely related to the point of reference I6 201. Item I9 231 that is distantly related to I6 201, requiring three links (L09-L05-L56, L89-L28-L26, etc.) to reach I6 201, and is illustrated in a diminutive size relative to each of the other nodes I0–I8. By displaying nodes in a prominence that depends upon each node's degree of separation from a user's point of reference, the nodes that are likely to be of interest to the user for subsequent access are easily discernable to the user, and the nodes that are likely to be of little interest to the user are less obtrusive to the user.

Figure 3:
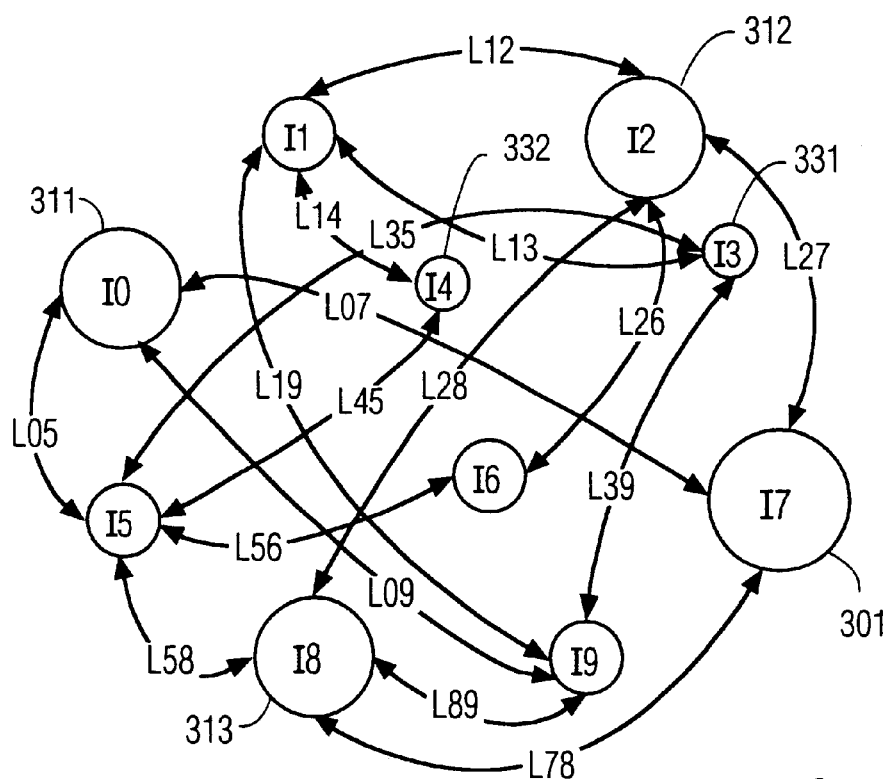

FIG. 3 illustrates an example display of the same lattice structure of FIGS. 1 and 2, but with node I7 301 selected as the point of reference. As can be seen, the visual impression provided by FIG. 3 is substantially different from the impressions provided by FIGS. 1 and 2, even though they each display the same information items, and the same relationships among these items. It is immediately apparent from FIG. 3 that nodes I0 311, I2 312, and I8 313 are closely related to the point of reference I7 301, and that nodes I3 331 and I4 332 are distantly related to the point of reference I7 301.

Figure 4:
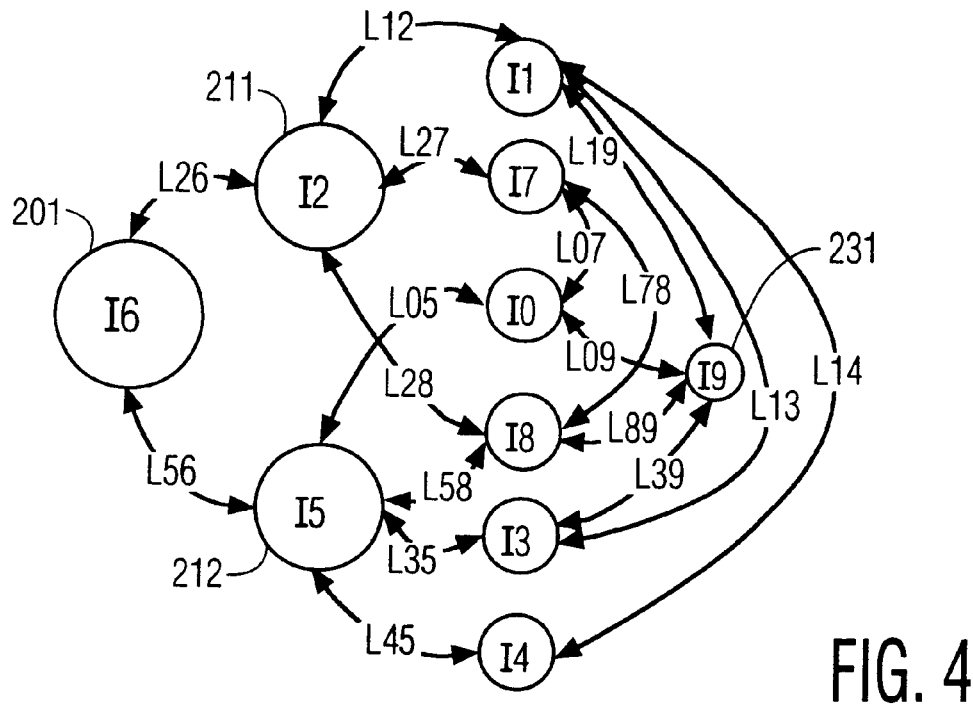

Other display characteristics may be used in addition to or in lieu of size to indicate prominence. FIG. 4 illustrates an example display of the lattice network of FIG. 2 wherein position is also used to indicate the relation of the information items to node I6 201. The nodes are ordered in left-to-right order based upon their degrees of separation from the reference node I6 201. In the illustration of FIG. 4, it is even more apparent that node I9 231 is distantly related to reference node I6 201, while nodes I2 211 and I5 212 are closely related.

Figure 5:
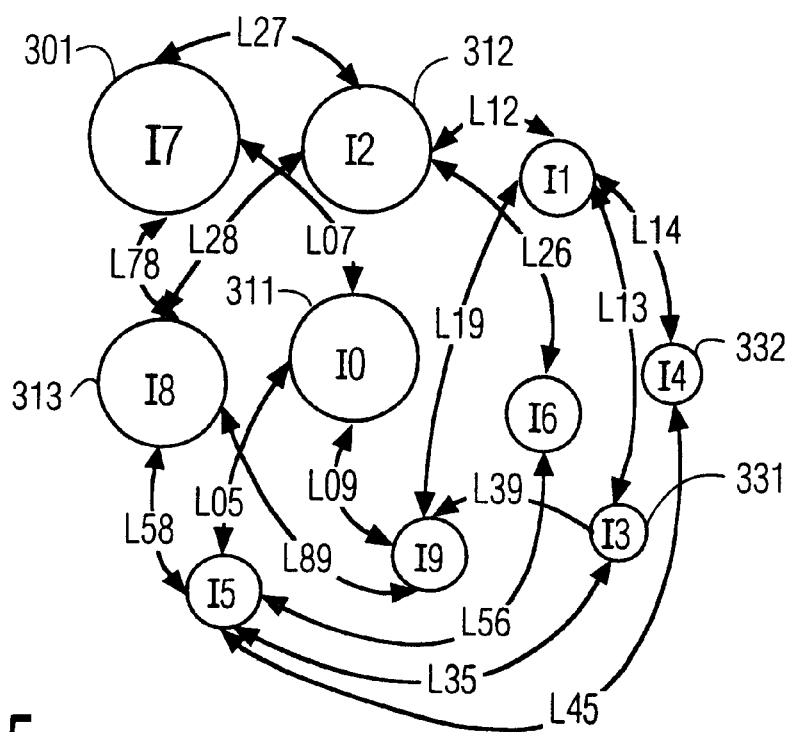

FIG. 5 illustrates an alternative example display of a lattice network that uses location to indicate a relational distance from a reference node I7 301, corresponding to the lattice network of FIG. 3. In this alternative example, both vertical and horizontal positioning is used to indicate degrees of separation from the reference node I7 301, which is located in an upper left position in FIG. 5. Nodes of decreasing relationship to the reference node I7 301 are placed increasingly to the right and down from the reference node I7 301. As can be seen, distantly related nodes I3 331 and I4 332 are located in the lower right region of FIG. 5, while closely related nodes I0 311, I2 312, and I8 313 are located predominantly in the upper left region of FIG. 5.

Figure 6:
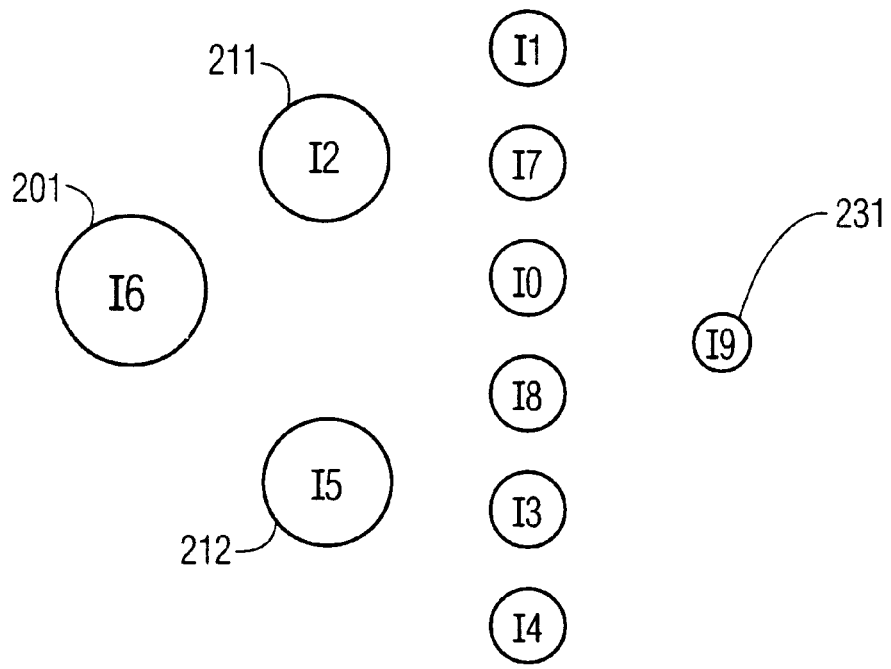

Because display prominence is used to indicate degrees of relationships to a reference node in accordance with this invention, the need for displaying the individual links that establish these relationships is diminished. FIG. 6 illustrates an example display of the lattice structure of FIG. 4, sans links. As can be seen, even though the details of the relationships among items is absent, the example display of FIG. 6 clearly conveys the degree of relationship of each item to the reference node I6 201, and in particular the close relationship of I2 211 and I5 212 and distant relationship of I9 231.

Figure 7:
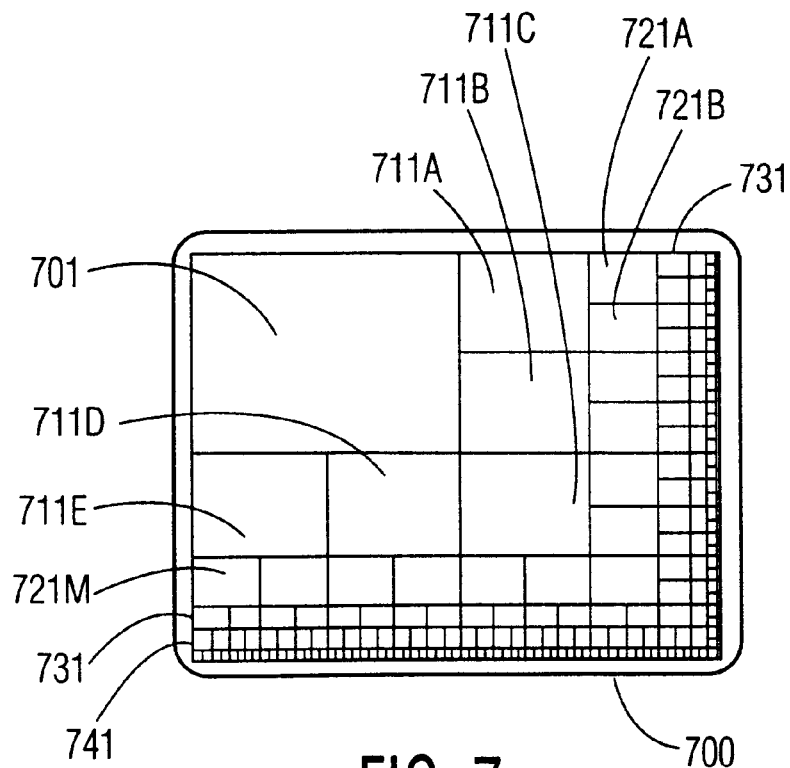

FIG. 7 illustrates an example display of a lattice network that is designed to accommodate a large number of related information items on a conventional rectangular display 700. The user selected node of reference is illustrated by the large area 701. In an example application, the displayed lattice network may represent information items related to a television series. The large area 701 will contain an image or video corresponding to a particular episode. Closely related to the episode 701 are the actors or characters that appear in that episode, and information about each actor or character that are strongly related to the episode 701 is presented in areas 711A–711E. The number of areas of type 711 is arbitrary, and will be dependent upon the number of information items that are determined to be closely related to the episode 701. The areas 711 are not limited to items of a particular type, such as actors, and may contain, for example, key frames for each segment of the episode 701. Not all actors need appear in the closely related areas 711; the relationship links between nodes in a preferred embodiment also include a link-weight, indicating the connective strength of each link. An actor that has a cameo appearance in the episode 701, for example, is not as closely related to the episode 701 as another actor that appears in every scene of episode 701. Beyond the areas 711 of closely related items to the reference node 701 are areas 721A–721M that are less closely related, and beyond these areas 721 are areas 731 and 741 which are progressively less closely related areas to the reference node 701. In a preferred embodiment, the user is provided options for adjusting the scale of the displayed representation to accommodate the inclusion of fewer or more information items on the display. The user is also provided the option of reducing the size of each area or sets of areas, except that, in a preferred embodiment, the areas are constrained to be monotonically sized with respect to the strength or closeness of the relationship to the reference node 701.

It is significant to note that a reduction in size of each area or sets of areas as a function of the distance from the reference node 701 provides for an efficient communication of information as a function of the distance from the reference node 701. That is, for example, at a constant display screen resolution, a smaller scaled version of an image can be encoded for transmission with fewer bytes than a larger scaled version of the same image. In this manner, the bandwidth required for communicating an image associated with each node will be dependent upon each nodes distance from the reference node 701, with less bandwidth being consumed by distantly related nodes.

The layout of the lattice display in accordance with this invention may take a variety of forms, depending on aesthetics, area efficiency, number of information items, and so on. The layout of FIG. 7 illustrates a fractal layout. Fractal layouts are particularly useful for the layout of decreasing size areas, because fractals are based on recursion; the same function is called repeatedly. In the illustration of FIG. 7, the basic function is one that divides an area in quarters, then divides each outer (right and down) subdivided area into quarters repeatedly. Because the outer areas are repeatedly divided into quarters, an infinite number of areas of increasingly smaller sizes can be generated by this "quartering" fractal function. The resolution of the display will limit the number of areas that can be practically utilized, but the use of the recursive algorithm automatically provides an efficient layout for any sized display area. Other fractal functions are common in the art, including for example, functions that produce spirals of decreasing sized area segments. Although a spiral may not provide optimal display area utilization, it may be desirable for its aesthetics. In like manner, other shapes, such as a triangular array, or a honeycomb display may be utilized as well. Alternative visual effects and characteristics may also be used to present information items with a prominence that is dependent upon the relationship between the displayed items. For example, the resolution of the presentation of each information item may be dependent upon the relationship of the displayed items to the referenced node 701. In a preferred embodiment, items that are closely related to the reference node 701 are displayed at a higher resolution than those having a more distant relationship to the reference node 701.

Note that the presentation of related information items need not have a strict correspondence with the different sized areas of the lattice display. For example, in FIG. 7, there are five areas 711A–711E that are one-fourth the size of the reference node display area 701, thirteen areas 721A–721M that are one-sixteenth the size, twenty nine areas that are one-sixty-fourth the size, and so on. It would be extremely rare that the lattice structure being displayed has exactly five nodes that are within one link of the reference node, thirteen nodes that are within two links, and so on. In a preferred embodiment, the nodes are sorted by their distances from the reference node and placed in the stepwise decreasing size areas in that order. For example, if there are seven nodes that are within one link of the reference node and the layout of FIG. 7 is used, five of the seven nodes are placed in the areas 711A–E, and the remaining two nodes in the areas 721A and 721B. Thereafter, the nodes that are within two links of the reference node are placed in the remaining areas 721C–721M in a clockwise fashion. The exact order of placement is not significant, except that, as stated above, in a preferred embodiment, the prominence of the areas associated with increasingly distant nodes from the reference node should be a monotonic function. If the nodes are related to each other by a continuous weight function, the aforementioned sorting will typically result in a continuum of distances from the reference node, and an algorithm, such as the aforementioned clockwise placement within each decreasing size area is used to associated each node with each segmented area.

Also note that the number of segmented areas need not correspond exactly to the number of information items. If, for example, the display 700 has a resolution that limits the number of segmented areas to areas that are at least one sixty-fourth the area of the reference node area 701, then seventy seven segmented areas (1+5+13+29+29) can be created in the display 700. Thus, the reference node and the first seventy six nodes from the aforementioned sorted list will be displayed.

Figure 8A:
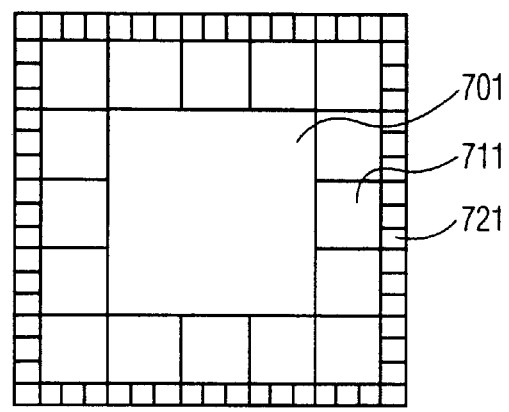
FIGS. 8A–8D illustrate additional example lattice displays in accordance with this invention.
Figure 8B:
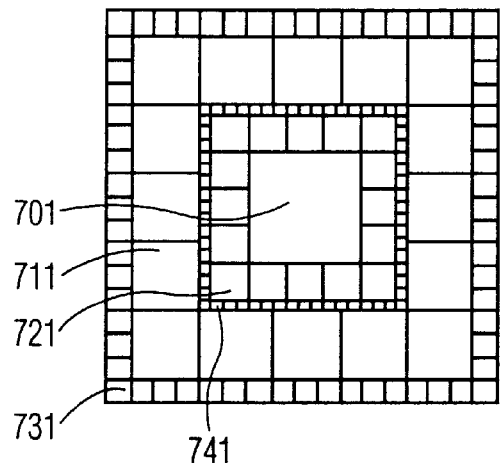
Figure 8C:
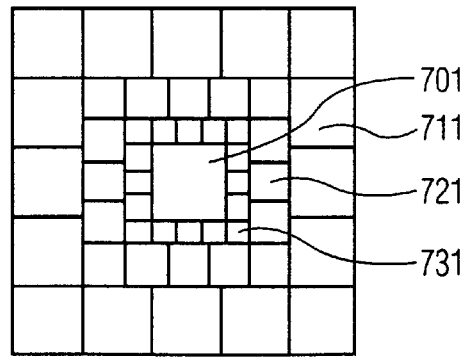
Figure 8D:
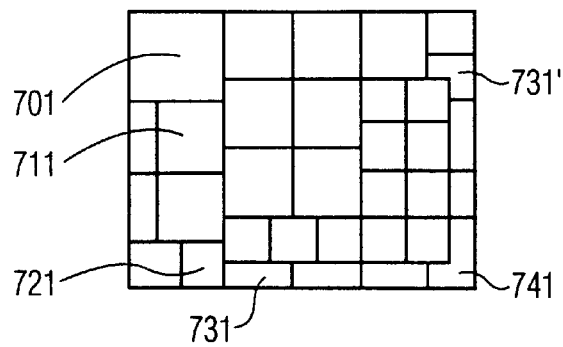

In the example layout of FIG. 7, both location and size are used as indicators of prominence. The particular ordering of location as an indicator of prominence is not necessarily significant. FIG. 8A, for example, illustrates a layout that uses size and distance from the center of the layout as indicators of prominence. In FIGS. 8A–8D, the reference numerals 701, 711, 721, and so on are used to indicate the reference node area and each decreasingly size areas, respectively, as in FIG. 7. FIG. 8B illustrates an example non-monotonic use of location for aesthetic effect, yet still conveys a sense of prominence based on size. FIG. 8C illustrates an example wherein a mix of size and location determines prominence. The center reference node area 701 is not significantly larger than the outer closely related areas 711, but its position in the center of the display differentiates it 701 from the similarly sized areas 711. FIG. 8D illustrates a non uniform arrangement of different size areas, as might be used, for example, to provide a correspondence between the number of information items at each distance from the reference node and the number of boxes of the same size. The example of FIG. 8D provides a correspondence to a lattice structure that has nine nodes (corresponding to nine equal size areas 711) within one link of the reference node; fourteen nodes (fourteen equal size areas 721) that are within two links of the reference node, seven nodes (seven equal size areas 731) within three links of the reference node, and at least two nodes (two equal size areas 741) within four links of the reference node. The lattice structure may have additional nodes within four or more links of the reference node, but the choice of area sizes for the closer nodes precludes their display. Note that in FIG. 8D arbitrary shaped areas, such as 731', are used as well. Thus, as illustrated, although the choice of layout structure may vary, a node's degree of separation from a reference node is indicated, in accordance with this invention, by the prominence of the display area allocated to the node. In like manner, other display characteristics, such as luminance, chrominance, outlining, highlighting, blinking, and so on, may be used to convey differing levels of prominence. These and other techniques for conveying prominence are common to one of ordinary skill in the art of graphic design or the art of human visual perception.

Figure 9:
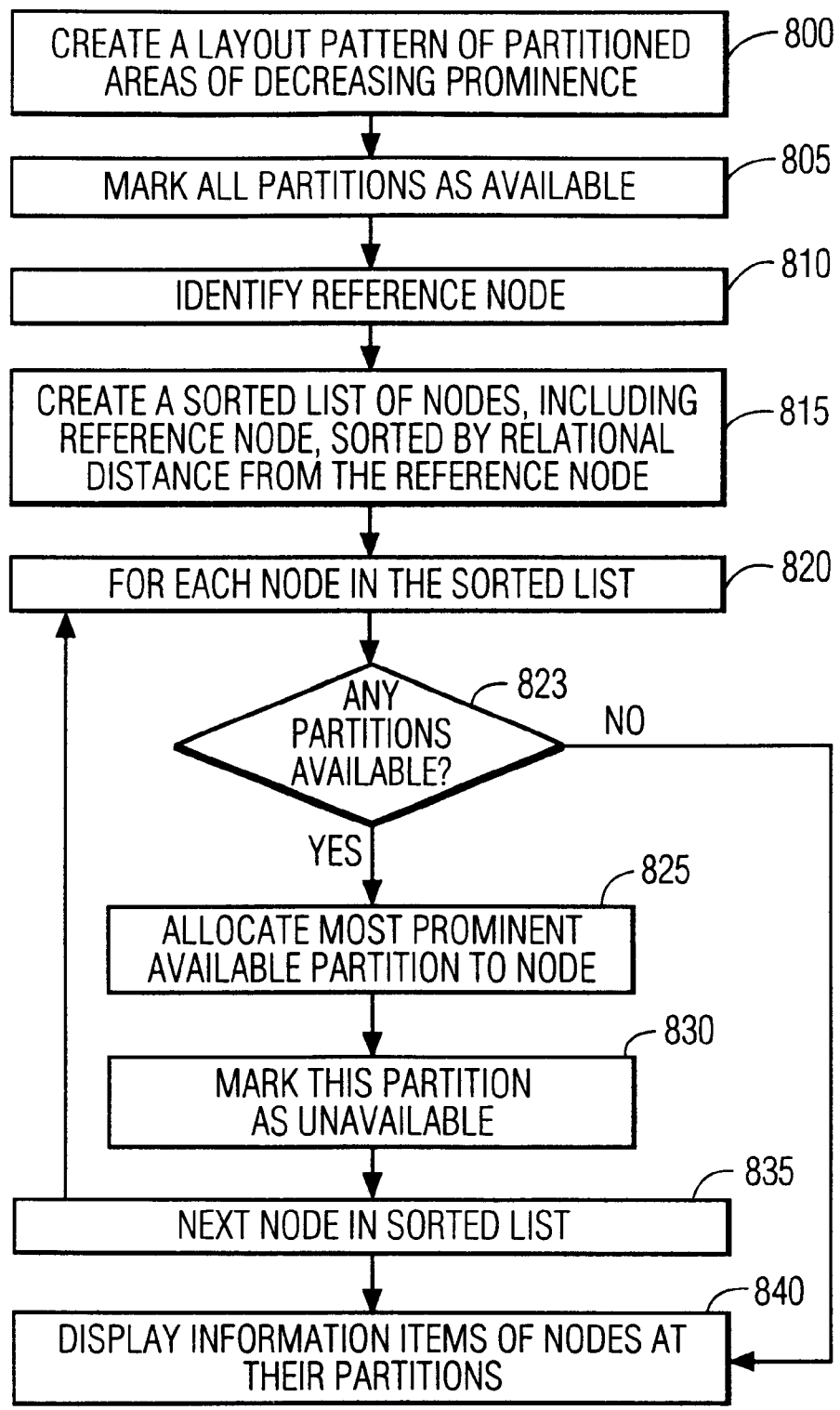
FIGS. 9 and 10 illustrate example flow diagrams for a lattice display in accordance with this invention.

FIG. 9 illustrates an example flow chart for allocating information items to areas of decreasing prominence based on the distance of each information item relative to a reference node. At 800, a layout of partitioned areas is created, for example, similar to those presented in FIGS. 7 and 8A–8D. Each of the partitions is marked as being available, at 805. A reference node is identified at 810, typically by a user identifying a node of interest within the database of information items. A variety of techniques may be used to effect the selection of the node of interest that is used as the reference node for the display. A user may progressively select nodes of interest by clicking a pointer on a displayed image 711–741 corresponding to the selected node. Alternatively, selection rules may be defined for automating the selection process. For example, if the nodes correspond to time dependent information, such as available television programs, the selection rules may specify different nodes to be selected at particular times of the day. The rules may also be event driven. For example, the nodes may represent available public stock offerings, and the selection rules may specify the selection of a particular node when the price of the stock reaches a particular level, or when another source, such as a news bulletin, refers to the stock. These and other automated or assisted selection techniques will be apparent to one of ordinary skill in the art in light of this disclosure.

Each of the information items are sorted by their distance from the selected reference node, at 820. It is assumed herein that each information item is characterized as a node in a data structure that reflects relations among the node such that a relative distance can be determined between and among each node in the data structure. In a straightforward implementation, links between nodes are identified and the minimum number of links between each node and the reference node is the link distance from the reference node, as discussed with respect to FIGS. 1–6. In another implementation, each of the aforementioned links are assigned a link weight, and the distance between two nodes is determined as the minimum sum of link weights between the two nodes. Alternative means are common for identifying relative distances between information items. For example, an information item may have an associated binary code that contains an encoding of multiple characteristics of the information item. Items having similar codes are considered to be closely related, items having dissimilar codes are considered distantly related. Algorithms are common in the art for determining closeness of binary codes, for example via a determination of the Hamming distance between the codes.

The nodes in the sorted list, including the reference node, are allocated partitions via the loop 820–835, until all the nodes receive an allocation, or until there are no remaining partitions to allocate, whichever occurs first. If, at 823, there are remaining partitions, the next node in the sorted list is allocated the most prominent partition, at 825, and that partition is marked as being unavailable, at 830. An alternative to the explicit loop 820–835 is to create a sorted list of all the partitions, based on their prominence, and effect a one-to-one mapping between the sorted list of nodes and the sorted list of partitions.

At 840, the information items are displayed within their allocated partitions. The information items may contain explicit display information, or they may contain references to related display information. For example, the information item may be a particular television program, and may contain a reference to a location on a recorded tape that contains the program, or it may contain the channel number at which it is currently being broadcast. The display of the information item at 840 in this example will include the acquisition and display of the referenced information, by effecting a playback of the tape at the referenced location, or by switching a television tuner to the referenced channel number. In like manner, the referenced information may be an identification of a web page on the Internet, and the display of the information at 840 will include an access and display of that web page. As discussed above, in accordance with this invention, the communication of each node's reference information can be optimized as a function of each node's distance from the reference node, devoting less bandwidth to the more distantly related nodes. Techniques are common in the art that provide for a reduction in bandwidth requirements as a function of scale and resolution. For example, copending U.S. patent application "Adaptive Buffer Regulation Scheme for Bandwidth Scalability", by Tzou et al, Ser. No. 09/219,832, filed Dec. 23, 1998, and incorporated by reference herein, discloses a method for regulating bandwidth by adjusting the quantizing factor used for MPEG and similar encodings. In like manner, other techniques, such as wavelet encoding and transmission, may be used to communicate each node's reference information at varying levels of resolution and scale.

Upon display, other ancillary actions may be effected relative to these information items. For example, consider a data base of individuals in an organization. The selection of a reference item/individual may initiate a telephone call to that individual while at the same time displaying an image of that individual and other individuals who are related to that individual, such as coworkers, boss, spouse, and so on. An option could then be provided to initiate a conference call by identifying one or more of the other displayed individuals. After communications are established, the image of each individual could be replaced by a live video image of the individual to effect a video conference. These and other ancillary processes will be evident to one of ordinary skill in the art in light of this invention. In like manner, the information that is displayed corresponding to each node may vary depending upon the relationship of each node to the reference node, and other factors. For example, the displayed information may be an icon, with more detailed information being provided when the user clicks the location of the icon on the display. The information associated with a node may also be a reference to an active or inactive process. For example, the reference node may be a particular customer and a related node may be a window containing a spread sheet of the customer's transactions; selecting the spread sheet may provide direct access to the window for modifying the displayed information, or it could activate an accounting program for adding invoices and the like. The use of these and other interactive display techniques will be apparent to one of ordinary skill in the art in light of this disclosure.

Figure 10:
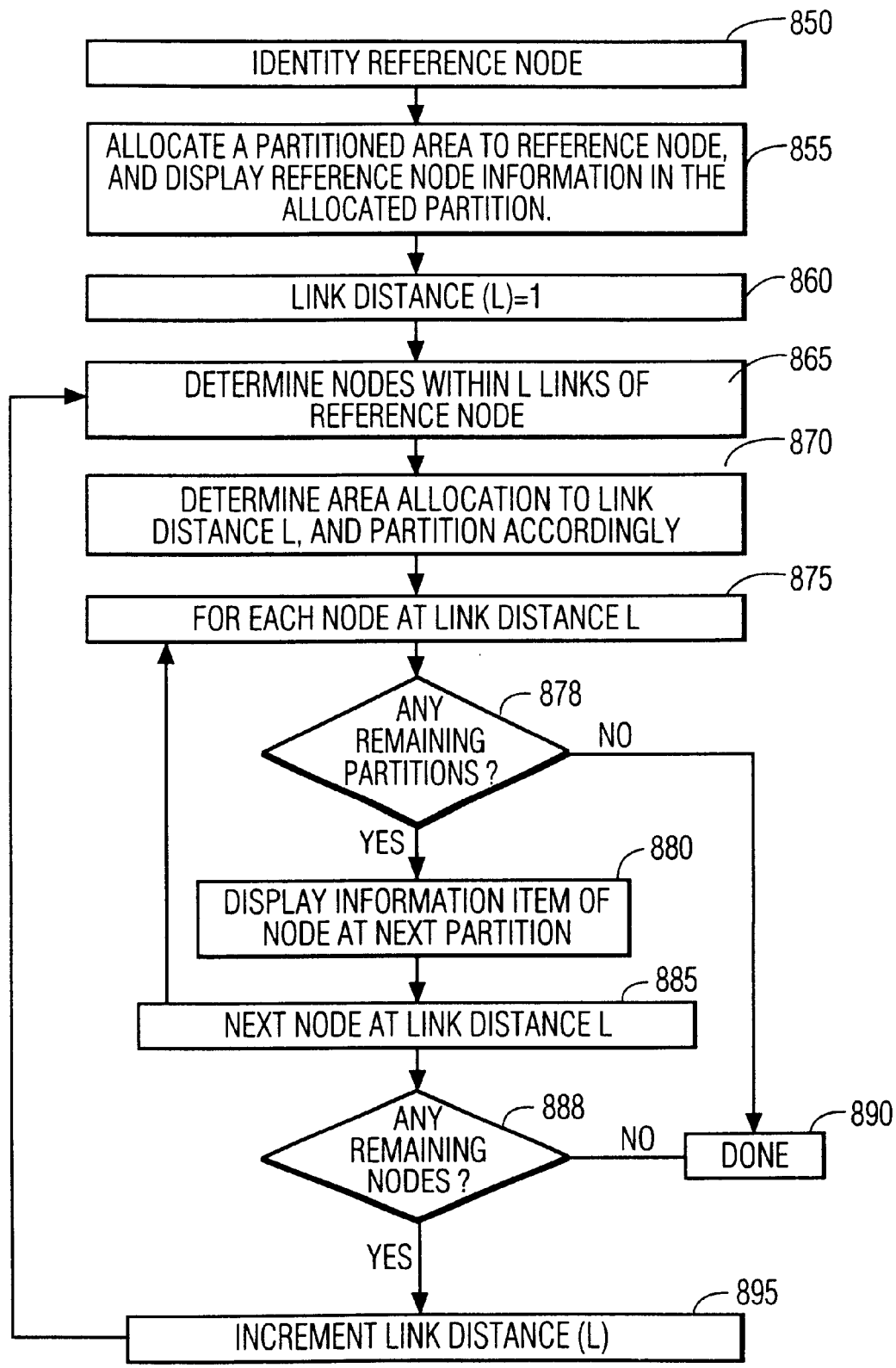

FIG. 10 illustrates an alternative example flow chart for providing a display of related information items that allocates areas of decreasing size to the information items at increasing link distances from a reference node. In the example flow chart of FIG. 10, the number of areas at each decreasing size is determined by the number of information items at each link distance from the reference node, similar, for example, to the allocation illustrated in FIG. 8D. At 850, a reference node is identified, and at 855 a partition is allocated, and the information related to the reference node is displayed in this partitioned area, as discussed above with respect to block 840 of FIG. 9. Thereafter, via the loop 865–895, items at increasing link distance from the reference area are allocated partitions of decreasing size. At 860, the link distance is initialize to one, and all nodes that are within one link distance of the reference node are identified, at 865.

Based on the number of nodes at the current link distance, equal sized partitions are allocated for this link distance, at 870. In a preferred embodiment, the display of information items of at least two link distances are preferred. Therefore, less than all of the remaining display area is allocated to the display of items within one link distance of the reference node. A nominal size partition area is predefined for the display of items within one link distance of the reference node. If the number of nodes at a link distance of one allows the nominal size partition area to be used within less than all the remaining display area, each of the nodes at a link distance of one are provided a partition of this nominal size. If there are too many nodes at a link distance of one to allow the use of the nominal size, the partition size is suitably reduced to accommodate all the nodes at a link distance of one. Subsequent allocations of area and partitions, for subsequent link distances, are effected by determining a partition size that is smaller than the prior link distance partition size, and allocating each node at each link distance a partition of the determined size, until all the nodes at that link distance have an allocated partition, or until there are no partition sized areas available on the display area. The loop 875–885 processes each node at the current link distance from the reference node, and displays the information related to each of the nodes, at 880. After all the nodes are processed 888 or all the partitions are allocated 878, the process ends at 890.

Figure 11:
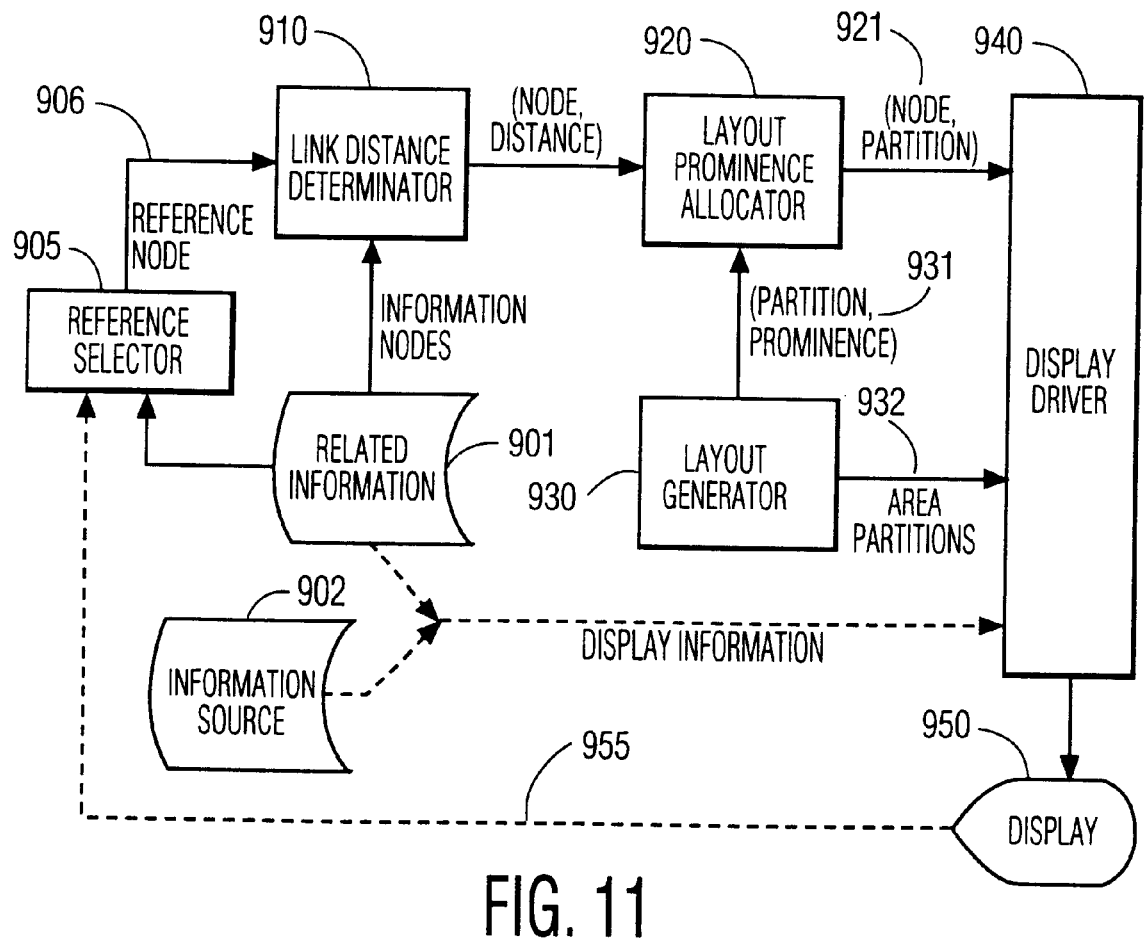
FIG. 11 illustrates an example block diagram for a lattice display device in accordance with this invention.

FIG. 11 illustrates an example block diagram of a display system in accordance with this invention. As discussed above, it is assumed that a database 901 exists that contains information items that are related, and that the relational distance between each node in the database can be determined. From the items in the database of related information 901, a reference node 906 is identified 905, typically by a user selection of displayed items 955. The link distance determinator 910 determines the relational distance between each of the other information nodes in the database 901 and the reference node 906. A layout generator 930 partitions the area of a display 950 into partitions of differing prominence. In general, size is used to convey prominence, although other display characteristics may be used in lieu of or in addition to size. The layout prominence allocator 920 allocates partitions to each node, using the techniques discussed above, such that the prominence reflects the relational distance between each node and the reference node. The node-partition allocation 921 and the layout parameters of the partition 932 are provided to the display driver 940 for presentation to the display device 950. As discussed above, each node may contain a reference to other information in the database 901, or other information source 902, such as a television or Internet site, that provides the information that to is to be displayed in the partition that is allocated to the node.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the invention has been presented with respect to a single reference node. Consistent with this invention, a user may identify a selection of more than one node as a reference set, and the remaining information items will be presented in dependence upon their distances from the reference set, using for example, the minimum distance to any member of the selected set, or the minimum distance to a composite of all the members of the selected set, or the minimum sum of distances to all the members of the selected set, and so on. Also, the example lattice displays have been presented in two-dimensions. With continuing development of holographic techniques, virtual displays, and the like, the presentation of related items in a three-dimensional display in accordance with the principles of this invention would be evident to one of ordinary skill in the art, and within the intended scope of the following claims.

We claim:

1. A display system comprising:

a means for selecting a reference node from a plurality of nodes, a link distance determinator that determines a relational distance of each node of the plurality of nodes to the reference node, a layout generator that partitions a display area into a plurality of partitions, each partition of the plurality of partitions having a display prominence, a layout prominence allocator that allocates the plurality of nodes to the plurality of partitions in dependence upon the relational distance of each node to the reference node and the display prominence of each partition, wherein the layout generator is a fractal generator.

2. The display system of claim 1, further comprising:

a display device that displays information associated with each node in each allocated partition of the display area.

3. The display system of claim 2, wherein the information associated with at least one node of the plurality of nodes includes at least one of: an icon, a window, a web page, and a reference to other information.

4. The display system of claim 1, wherein the display prominence corresponds to at least one of: a size parameter, a location parameter, a resolution parameter, a luminance parameter, a chrominance parameter, a shape parameter, a texture parameter, and a border parameter.

5. The display system of claim 4, wherein the information associated with each node is encoded in at least one of an MPEG encoding and a wavelet encoding.

6. The display system of claim 1, wherein information associated with each node is communicated to a display device via a communication path having an available bandwidth.

7. The display system of claim 6, wherein the available bandwidth is allocated to the information associated with each node in dependence upon the relational distance of each node to the reference node.

8. The display system of claim 1, wherein the relational distance of each node to the reference node is determined based on at least one of: a number of links between each node and the reference node, a weight of links between each node and the reference node, and a Hamming distance between an encoding of each node and an encoding of the reference node.

9. The display system of claim 1, wherein the means for selecting the reference node from a plurality of nodes is based on at least one of:

a selection from among a plurality of images associated with the plurality of nodes, and one or more selection rules.

10. A method for displaying information related to a plurality of related nodes, comprising the steps of:

creating a plurality of partitions, each partition of the plurality of partitions having a display prominence, selecting a reference node from the plurality of related nodes, allocating each partition of the plurality of partitions to each node of the plurality of related nodes in dependence upon the display prominence of each partition and a relational distance between each node and the reference node, and displaying the information related to each node of the plurality of related nodes at the partition allocated to each node, wherein the step of creating the plurality of partitions includes a generation of a fractal pattern.

11. The method of claim 10, wherein the display prominence corresponds to at least one of: a size parameter, a location parameter, a resolution parameter, a luminance parameter, a chrominance parameter, a shape parameter, a texture parameter, and a border parameter.

12. The method of claim 10, wherein the relational distance of each node to the reference node is determined based on at least one of: a number of links between each node and the reference node, a weight of links between each node and the reference node, and a Hamming distance between an encoding of each node and an encoding of the reference node.

13. The method of claim 10, wherein the step of selecting the reference node from a plurality of nodes is based on at least one of:

a selection from among a plurality of images associated with the plurality of nodes, and one or more selection rules.

14. The method of claim 10, wherein:

the display prominence of a first partition is a first prominence type, the display prominence of a second partition is a second prominence type, the display prominence of a third partition is a third prominence type; and the step of allocating each partition includes the steps of:
  allocating the first prominence type to the reference node,
  allocating the second prominence type to a second node of the plurality of related nodes, and
  allocating the third prominence type to a third node of the plurality of related nodes, the relational distance of the third node from the reference node being greater than the relational distance of the second node from the reference node.

15. A computer program stored on a computer readable medium for presenting information for display, comprising:

a means for selecting a reference node from a plurality of nodes, a means for determining a relational distance of each node of the plurality of nodes to the reference node, a means for partitioning a display area into a plurality of partitions, each partition of the plurality of partitions having a display prominence, a means for allocating the plurality of nodes to the plurality of partitions in dependence upon the relational distance of each node to the reference node and the display prominence of each partition, wherein the means for partitioning the display area includes a fractal generator.

16. The computer program of claim 15, wherein the display prominence corresponds to at least one of: a size parameter, a location parameter, a resolution parameter, a luminance parameter, a chrominance parameter, a shape parameter, a texture parameter, and a border parameter.

17. The computer program of claim 15, wherein the relational distance of each node to the reference node is determined based on at least one of: a number of links between each node and the reference node, a weight of links between each node and the reference node, and a Hamming distance between an encoding of each node and an encoding of the reference node.

18. The computer program of claim 15, further including a means for communicating information related to each node via a communication path having an available bandwidth.

19. The computer program of claim 18, wherein the available bandwidth is allocated to the information associated with each node in dependence upon the relational distance of each node to the reference node.

* * * * *